(12) United States Patent
Kotzur et al.

(10) Patent No.: US 11,093,175 B1
(45) Date of Patent: Aug. 17, 2021

(54) RAID DATA STORAGE DEVICE DIRECT COMMUNICATION SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/838,224

(22) Filed: Apr. 2, 2020

(51) Int. Cl.
*G06F 12/00* (2006.01)
*G06F 3/06* (2006.01)

(52) U.S. Cl.
CPC .......... *G06F 3/0659* (2013.01); *G06F 3/0607* (2013.01); *G06F 3/0656* (2013.01); *G06F 3/0662* (2013.01); *G06F 3/0689* (2013.01)

(58) Field of Classification Search
CPC ............... G06F 3/0688; G06F 11/1076; G06F 13/1626; G06F 13/1642; G06F 13/18; G06F 13/26; G06F 13/4282; G06F 2213/0026; G06F 3/061; G06F 3/0619; G06F 3/0656; G06F 3/0659; G06F 3/0679
See application file for complete search history.

(56) References Cited

U.S. PATENT DOCUMENTS 9,384,093 B1 7/2016 Aiello
2006/0161709 A1* 7/2006 Davies ................. G06F 13/404
710/268
2018/0321844 A1 11/2018 Benisty

* cited by examiner

*Primary Examiner* — Yong J Choe
(74) *Attorney, Agent, or Firm* — Haynes and Boone, LLP

(57) ABSTRACT

A RAID data storage device direct communication system includes a first RAID data storage device that includes a first RAID data storage device controller having a first RAID data storage device function providing a second RAID data storage device submission queue in a first RAID data storage device memory subsystem, and a second RAID data storage device that includes a second RAID data storage device controller having a second RAID data storage device function providing a second RAID data storage device completion queue in a second RAID data storage device memory subsystem. The second RAID data storage device generates a command, transmits the command directly to first RAID data storage device and in the second RAID data storage device submission queue, and receives a completion message that is associated with the command directly from the first RAID data storage device and in the second RAID data storage device completion queue.

20 Claims, 10 Drawing Sheets

RAID DATA STORAGE DEVICE DIRECT COMMUNICATION SYSTEM

BACKGROUND

The present disclosure relates generally to information handling systems, and more particularly to providing direct communications between RAID data storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID data storage devices. As will be appreciated by one of skill in the art, RAID data storage systems are provided by a data storage virtualization technology that combines the physical RAID data storage devices into one or more logical storage units for the purposes of data redundancy, performance improvements, and/or other benefits known in the art. For example, data in a RAID data storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity.

The introduction of new storage technologies for use in RAID data storage systems has provided for performance and efficiency improvements in RAID data storage systems. For example, Non-Volatile Memory Express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect Express (PCIe) bus to provide low latency, internal parallelism, and/or other benefits known in the art, and have begun to be implemented as the RAID data storage devices discussed above in order to assist in data update operations for the RAID data storage system. The inventors of the present disclosure describe some techniques for performing RAID storage-device-assisted data updates in U.S. patent application Ser. No. 16/586,446, filed on Sep. 27, 2019, and those RAID data storage systems may utilize NVMe storage devices to perform some or all of the data update operations that are traditionally performed by a RAID storage controller device in the RAID data storage system. However, while such RAID storage-device-assisted data updates operate to offload data update operations from the RAID storage controller device, the RAID storage controller device still must issue commands to the RAID data storage devices in order to initiate their performance of those RAID storage-device-assisted data updates, and in some situations, the command overhead for the RAID storage controller device can become significant.

Accordingly, it would be desirable to provide a RAID data storage system absent the issues discussed above.

SUMMARY

According to one embodiment, an Information Handling System (IHS) includes a processing system; and a memory system that is coupled to the processing system and that includes instructions that, when executed by the processing system, cause the processing system to provide a second RAID data storage device engine that is configured to: generate a command; transmit the command directly to a first RAID data storage device and in a second RAID data storage device submission queue that is included in a first RAID data storage device memory subsystem and provided by a first RAID data storage device function provided in a first RAID data storage device controller in the first RAID data storage device; and receive a completion message that is associated with the command directly from the first RAID data storage device and in a second RAID data storage device completion queue that is included in a second RAID data storage device memory subsystem and provided by a second RAID data storage device function provided in a second RAID data storage device controller in the second RAID data storage device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
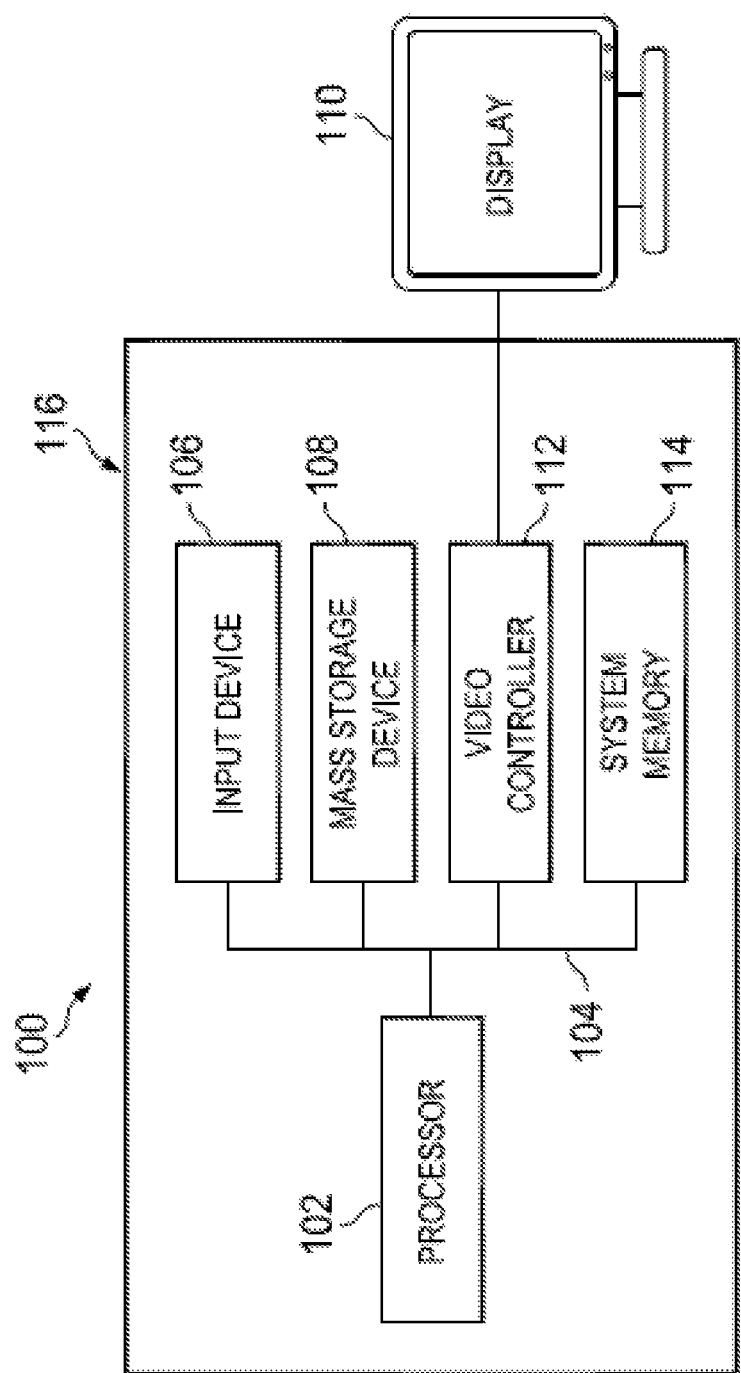
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
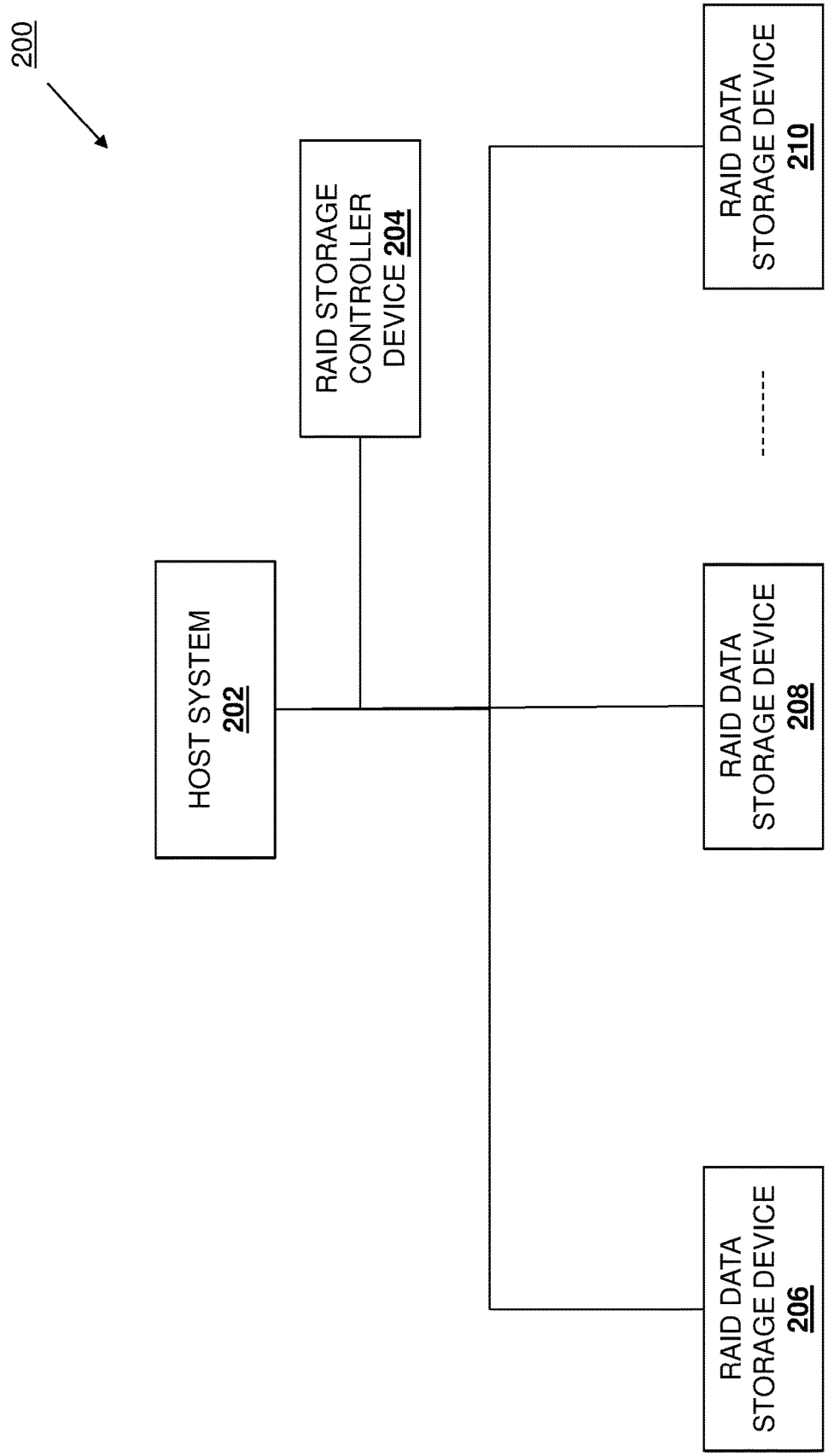
FIG. 2 is a schematic view illustrating an embodiment of a RAID data storage system.

Referring now to FIG. 2, an embodiment of a Redundant Array of Independent Disks (RAID) storage system 200 is illustrated. In the illustrated embodiment, the RAID data storage system 200 includes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID data storage system 200 also includes a RAID storage controller device 204 that is coupled to the host system 202 and that may be provided by the IHS 100 discussed above with reference to FIG. 1, and/or may include some or all of the components of the IHS 100. For example, the RAID controller system 204 may include any storage device/disk array controller device that is configured to manage physical storage devices and present them to host systems as logical units.

Furthermore, in the illustrated embodiment, the RAID data storage system 200 also includes a plurality of RAID data storage devices 206, 208, and up to 210, each of which is coupled to the host system 202 and the RAID storage controller device 204. While a few RAID data storage devices 206-210 are illustrated, one of skill in the art in possession of the present disclosure will recognize that many more storage devices may (and typically will) be coupled to the RAID storage controller device 204 (e.g., in a datacenter) while remaining within the scope of the present disclosure. In the embodiments discussed below, the RAID data storage devices 206-210 are described as being provided by Non-Volatile Memory Express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID data storage system 200 has been illustrated and described, one of skill in the art in possession of the present disclosure will recognize that the RAID data storage system of the present disclosure may include a variety of components and component configurations while remaining within the scope of the present disclosure as well.

Figure 3:
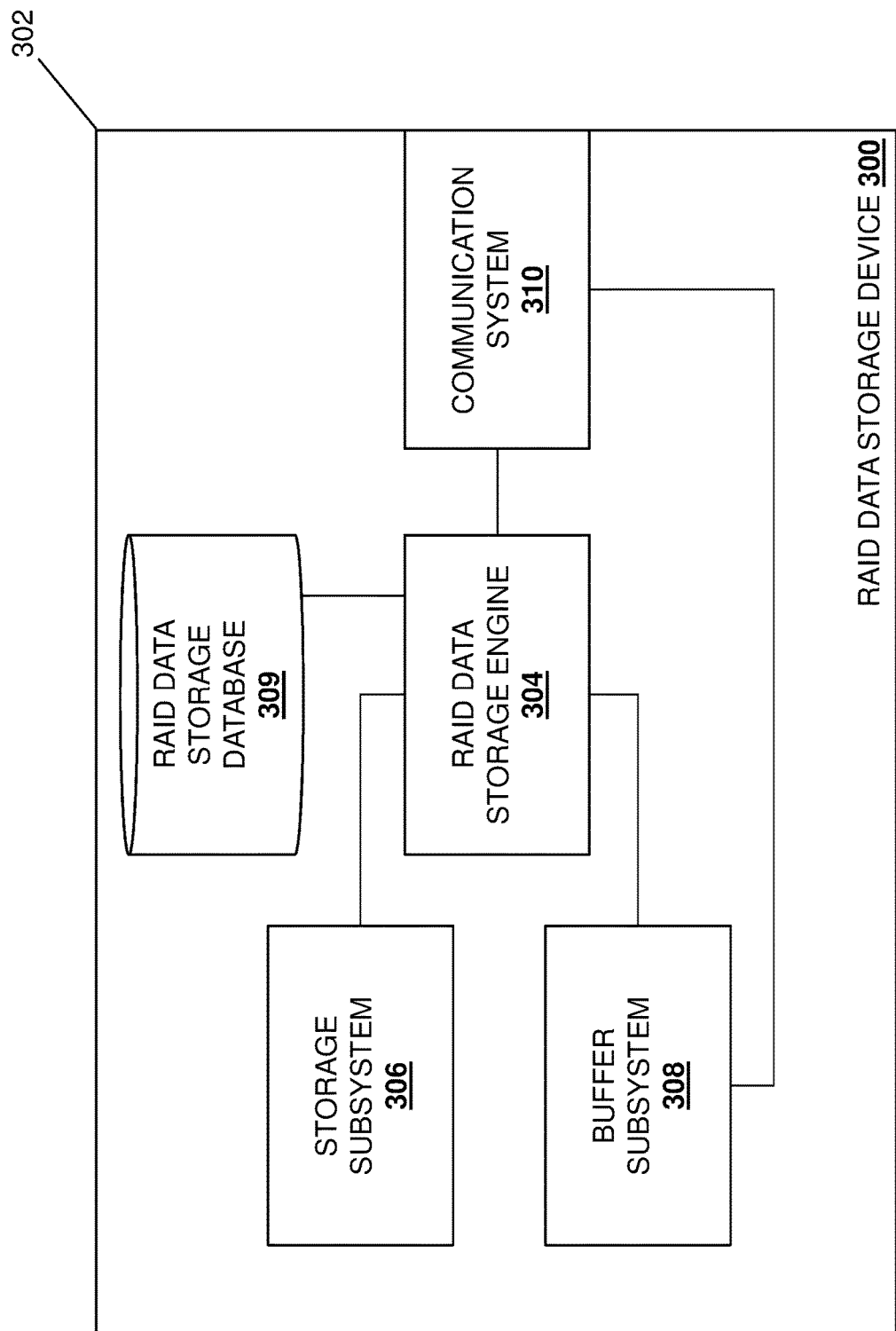
FIG. 3 is a schematic view illustrating an embodiment of a RAID data storage device that may be provided in the RAID data storage system discussed above with reference to FIG. 2.

Referring now to FIG. 3, an embodiment of a RAID data storage device 300 is illustrated that may provide any or all of the RAID data storage devices 206-210 discussed above with reference to FIG. 2. As such, the RAID data storage device 300 may be provided by an NVMe SSD storage devices, but one of skill in the art in possession of the present disclosure will recognize that other types of storage devices with similar functionality as the NVMe SSDs (e.g., NVMe PCIe add-in cards, NVMe M.2 cards, etc.) may be implemented according to the teachings of the present disclosure and thus will fall within its scope as well. In the illustrated embodiment, the RAID data storage device 300 includes a chassis 302 that houses the components of the RAID data storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID data storage devices discussed below. While not illustrated, one of skill in the art in possession of the present disclosure will recognize that the RAID storage engine 304 may include, or be coupled to, other components such as queues (e.g., submission queues and completion queues) and/or RAID data storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID data storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer subsystem 308 that is coupled to the RAID storage engine 304 (e.g., via a coupling between the buffer subsystem 308 and the processing system). Continuing with the example provided above in which the RAID data storage device 300 is an NVMe SSD storage device, the buffer subsystem 308 may be provided by a Controller Memory Buffer (CMB). However, one of skill in the art in possession of the present disclosure will recognize that the buffer subsystem 308 may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to storage any of the information utilized by the RAID storage engine 304 as discussed below.

The chassis 302 may also house a communication system 310 that is coupled to the RAID storage engine 304 (e.g., via a coupling between the communication system 310 and the processing system) and the buffer subsystem 308, and that may be provided by any of a variety of storage device communication technologies and/or any other communication components that would be apparent to one of skill in the art in possession of the present disclosure. Continuing with the example provided above in which the RAID data storage device 300 is an NVMe SSD storage device, the communication system 310 may include any NVMe SSD storage device communication components that enable Direct Memory Access (DMA) operations, as well as any other NVMe SDD storage device communication functionality that would be apparent to one of skill in the art in possession of the present disclosure. While a specific RAID data storage device 300 has been illustrated, one of skill in the art in possession of the present disclosure will recognize that RAID data storage devices (or other devices operating according to the teachings of the present disclosure in a manner similar to that described below for the RAID data storage device 300) may include a variety of components and/or component configurations for providing conventional RAID data storage device functionality, as well as the functionality discussed below, while remaining within the scope of the present disclosure as well.

Figure 4:
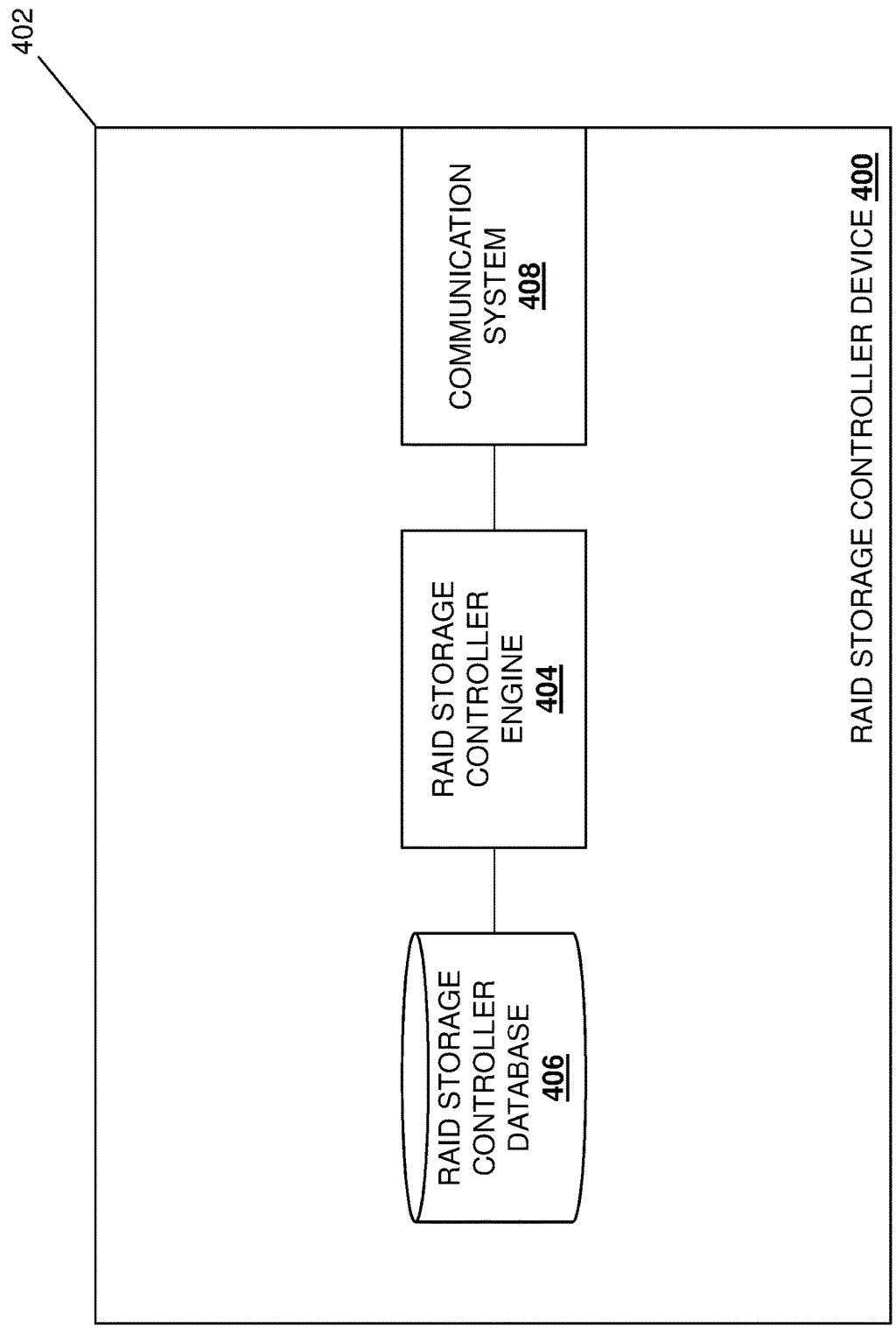
FIG. 4 is a schematic view illustrating an embodiment of a RAID storage controller device that may be provided in the RAID data storage system discussed above with reference to FIG. 2.

Referring now to FIG. 4, an embodiment of a RAID storage controller device 400 is illustrated that may provide the RAID storage controller device 204 discussed above with reference to FIG. 2. As such, the RAID storage controller device 400 may be provided by the IHS 100 discussed above with reference to FIG. 1 and/or may include some or all of the components of the IHS 100. Furthermore, while illustrated and discussed as a RAID storage controller device 400, one of skill in the art in possession of the present disclosure will recognize that the functionality of the RAID storage controller device 400 discussed below may be provided by other devices that are configured to operate similarly as discussed below. In the illustrated embodiment, the RAID storage controller device 400 includes a chassis 402 that houses the components of the RAID storage controller device 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage controller engine 404 that is configured to perform the functionality of the RAID storage controller engines and/or RAID storage controller devices discussed below.

The chassis 402 may also house a storage system (not illustrated, but which may include the storage 108 discussed above with reference to FIG. 1) that is coupled to the RAID storage controller engine 404 (e.g., via a coupling between the storage system and the processing system) and that includes a RAID storage controller database 406 that is configured to store any of the information utilized by the RAID storage controller engine 404 discussed below. The chassis 402 may also house a communication system 408 that is coupled to the RAID storage controller engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

While a specific RAID storage controller device 400 has been illustrated, one of skill in the art in possession of the present disclosure will recognize that RAID storage controller devices (or other devices operating according to the teachings of the present disclosure in a manner similar to that described below for the RAID storage controller device 400) may include a variety of components and/or component configurations for providing conventional RAID storage controller device functionality, as well as the functionality discussed below, while remaining within the scope of the present disclosure as well. For example, while the RAID storage controller device 400 has been described as a hardware RAID storage controller device provided in a chassis, in other embodiments the RAID storage controller device may be a software RAID storage controller device provided by software (e.g., instructions stored on a memory system) in the host system 202 that is executed by a processing system in the host system 202 while remaining within the scope of the present disclosure as well. As such, in some embodiments, the operations of the RAID storage controller device 400 discussed below may be performed via the processing system in the host system 202.

Figure 5:
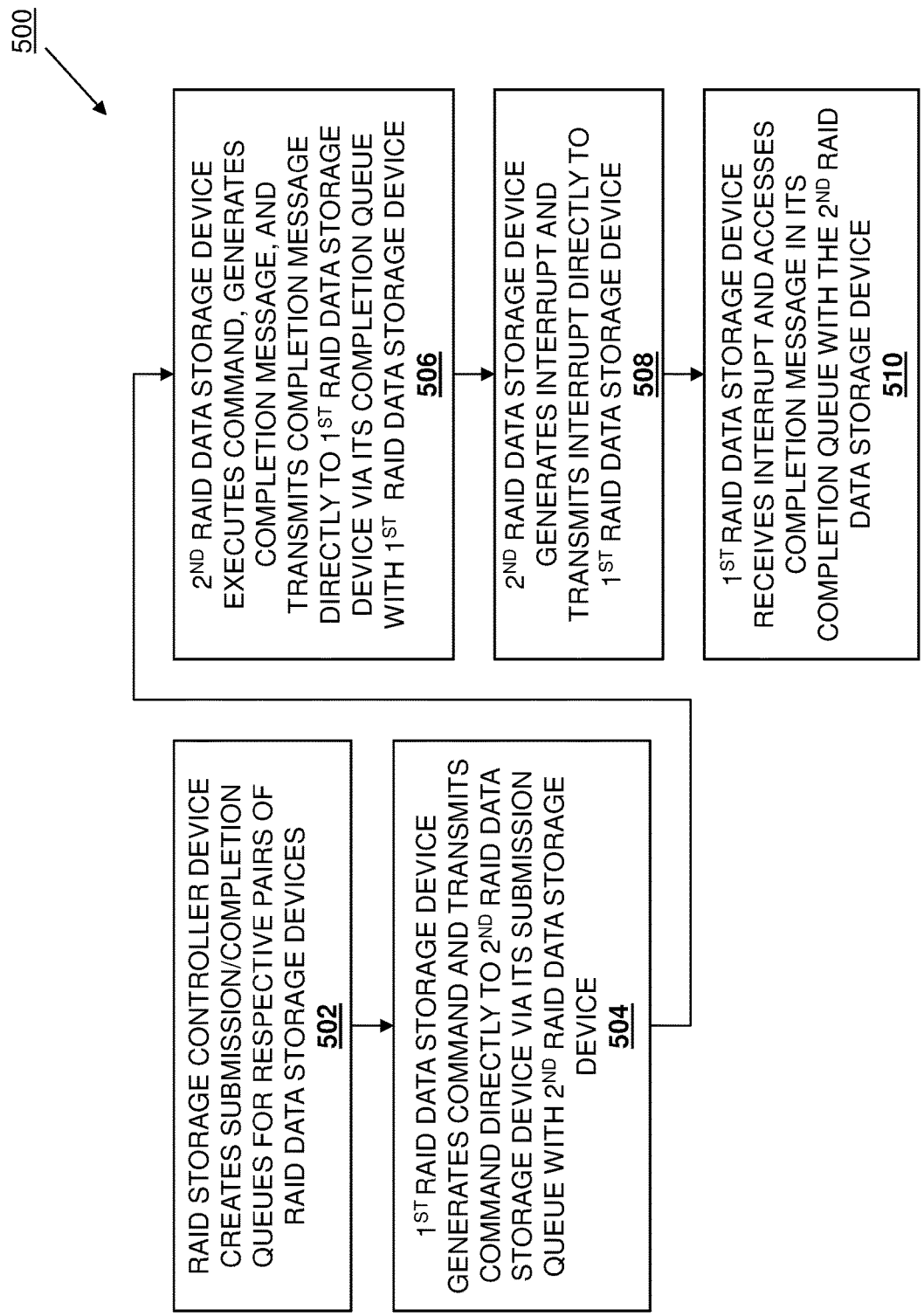
FIG. 5 is a flow chart illustrating an embodiment of a method for providing direct communication between RAID data storage devices.

Referring now to FIG. 5, an embodiment of a method 500 for providing direct communication between RAID data storage devices is illustrated. As discussed below, the systems and methods of the present disclosure provides RAID data storage devices in a RAID data storage system the ability to exchange command communications directly with each other. For example, a RAID storage controller device may operate to configure first RAID data storage device that includes a first RAID data storage device controller having a first RAID data storage device function with a second RAID data storage device submission queue in a first RAID data storage device memory subsystem, and may configure a second RAID data storage device that includes a second RAID data storage device controller having a second RAID data storage device function with a second RAID data storage device completion queue in a second RAID data storage device memory subsystem. The second RAID data storage device may then generate a command, transmit the command directly to first RAID data storage device and in the second RAID data storage device submission queue in the first RAID data storage device memory subsystem, and receive a completion message that is associated with the command directly from the first RAID data storage device and in the second RAID data storage device completion queue in the second RAID data storage device memory subsystem. As such, the RAID storage controller device is relieved of command communication overhead via the operation of the RAID data storage devices that are configured to directly communicate commands between each other to initiate their performance of RAID storage-device-assisted data updates and/or other RAID data storage device operations.

As discussed above, in U.S. patent application Ser. No. 16/586,446, filed on Sep. 27, 2019, the inventors of the present disclosure describe some techniques for performing RAID storage-device-assisted data updates that utilize RAID NVMe data storage devices to perform some or all of the data update operations that are traditionally performed by a RAID storage controller device in the RAID data storage system. The present disclosure extends this concept of using RAID data storage device to offload RAID storage controller device operations via techniques that enable the RAID data storage devices to exchange at least some of the command communications that are traditionally provided by a RAID storage controller device in the RAID data storage system. In a specific example described below, the RAID data storage device direct command communications may repurpose Single Root Input/Output Virtualization (SR-IOV) techniques, which one of skill in the art in possession of the present disclosure will recognize allow the isolation of Peripheral Component Interconnect Express (PCIe) resources for manageability and performance benefits. For example, SR-IOV may be conventionally utilized to allow a single physical PCIe component to be shared via a virtual environment as per the SR-IOV specification by, for example, offering different virtual functions to different virtual components (e.g., traditionally network adapters) on a physical computing device (e.g., a server device.)

For example, conventionally, SR-IOV virtual functions may be provided in an NVMe storage device for use when the NVMe storage device is directly connected to a root port and the RAID data storage system is running on a hypervisor. In such situations, it may be desirable to "split" the NVMe storage device resources and assign the respective NVMe storage device resources to different guest operating systems running on the hypervisor using the SR-IOV virtual functions, which one of skill in the art in possession of the present disclosure will recognize provides benefits such as, for example, allowing an otherwise underutilized NVMe storage device (e.g., underutilized by a single guest operating system that does not need all of the NVMe storage device resources) to have its NVMe storage device resources shared such that a more efficient NVMe storage device resource utilization is realized. One of skill in the art in possession of the present disclosure will appreciate that while the SR-IOV virtual functions are not technically necessary to share the NVMe storage device resources in the hypervisor (e.g., the hypervisor is capable of splitting the NVMe storage device resources itself), the utilization of the SR-IOV virtual functions provides efficiencies such as, for example, negating the need to go through the hypervisor each time a guest operating system accesses its portion of the NVMe storage device resources in the NVMe storage device, as SR-IOV allows the SR-IOV virtual functions to be directly assigned to respective guest operating systems such that those guest operating systems may communicate directly with the NVMe storage device to utilize their portion of the NVMe storage device resources. However, while particular SR-IOV virtual functions are described below, one of skill in the art in possession of the present disclosure will appreciate that the direct RAID data storage device command communications discussed below may be enabled utilizing other techniques that will fall within the scope of the present disclosure as well.

For example, non-SR-IOV enabled devices may include multiple "real" functions (as opposed to the virtual functions provided in the SR-IOV enabled devices discussed above) that may be utilized in substantially the same manner as the SR-IOV virtual functions described herein. Furthermore, rather than implemented via multiple virtual functions, a single real or virtual function that utilizes a memory subsystem (e.g., a CMB subsystem) may be partitioned into logical sections, with each logical section of the memory subsystem providing the submission and completion queues discussed below for different RAID data storage device pairs. As such, a wide variety of modification to the specific examples described herein is envisioned as falling within the scope of the present disclosure.

Figure 6A:
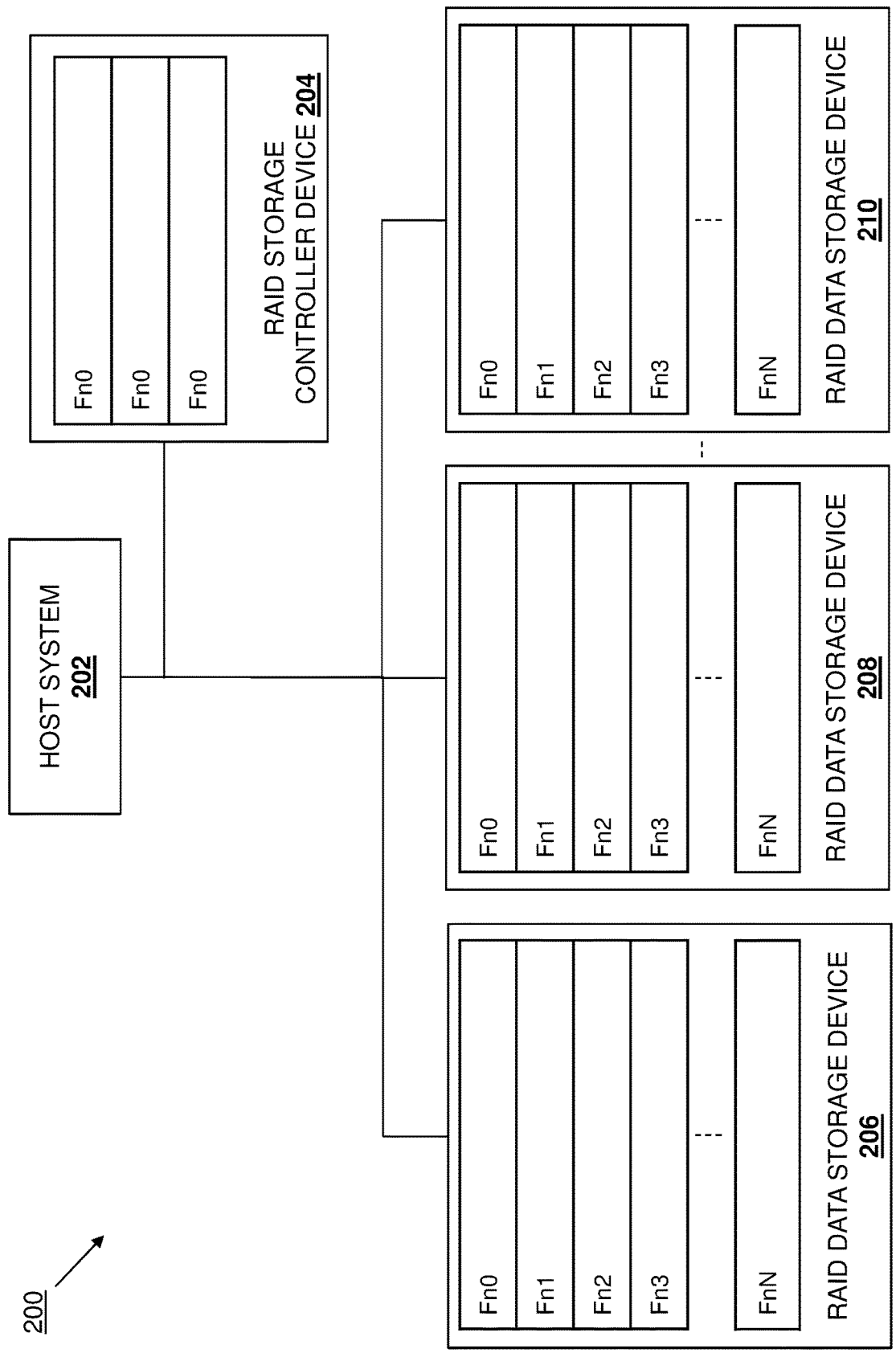
FIG. 6A is a schematic view illustrating an embodiment of the RAID data storage system of FIG. 2 operating during the method of FIG. 5.

The method 500 begins at block 502 where a RAID storage controller device creates submission/completion queues for respective pairs of RAID data storage devices. In an embodiment, at block 502, the RAID storage controller engine 404 in the RAID storage controller device 204/400 may operate at block 502 to communicate with each of the RAID data storage devices 206-210 to create submission/completion queues for respective pairs of the RAID data storage devices 206-210. With reference to FIG. 6A, each of the RAID data storage devices 206-210 are illustrated with SR-IOV virtual functions that may be provided using a RAID data storage controller provided by the RAID data storage engine 304 on that RAID data storage device 206/300-210/300. For example, FIG. 6A illustrates the RAID data storage device 206 including SR-IOV virtual functions Fn0, Fn1, Fn2, Fn3, and up to FnN, which as discussed above may each be provided using a RAID data storage controller provided by the RAID data storage engine 304 in the RAID data storage device 206/300. Similarly, FIG. 6A illustrates the RAID data storage device 208 including SR-IOV virtual functions Fn0, Fn1, Fn2, Fn3, and up to FnN, which as discussed above may each be provided using a RAID data storage controller provided by the RAID data storage engine 304 in the RAID data storage device 208/300. Similarly as well, FIG. 6A illustrates the RAID data storage device 210 including SR-IOV virtual functions Fn0, Fn1, Fn2, Fn3, and up to FnN, which as discussed above may each be provided using a RAID data storage controller provided by the RAID data storage engine 304 in the RAID data storage device 208/300. One of skill in the art in possession of the present disclosure will recognize that each SR-IOV virtual function may be associated with respective administrative submission and completion queues (e.g., provided by its RAID data storage controller) that may be utilized by the RAID storage controller engine 404 in the RAID storage controller device 204/400 to communicate with the SR-IOV virtual function (e.g., to set up the submission and completion queues for the RAID data storage device pairs as discussed below.)

As will be appreciated by one of skill in the art in possession of the present disclosure, the RAID storage controller device 204 may initially be "in charge" of the RAID data storage devices 206-210, and operates to communicate with the RAID data storage devices 206-210 via the respective SR-IOV virtual functions Fn0 provided for those RAID data storage devices 206-210. As illustrated in the embodiment illustrated in FIG. 6A, for the purposes of the examples below in which the SR-IOV virtual functions Fn0 utilize the submission and completion queues provided by the RAID storage controller device 204, and the memory subsystem for providing those submission and completion queues is illustrated as being located in the RAID storage controller device 204 (i.e., "host" memory is the normal location for submission queues and completion queues associated with NVMe storage devices.) For example, in order to issue a command to the RAID data storage device 206, the RAID storage controller device 204 may provide that command in the submission queue in its memory subsystem that was created for the virtual function Fn0 in the RAID data storage device 206a, and ring a "doorbell" for the virtual function Fn0 in the RAID data storage device 206a, which causes the virtual function Fn0 in the RAID data storage device 206a to retrieve the command from that submission queue. One of skill in the art in possession of the present disclosure will appreciate that the RAID storage controller device 204 may provide commands to the RAID data storage devices 208 and 210 in a substantially similar manner as well.

Figure 6B:
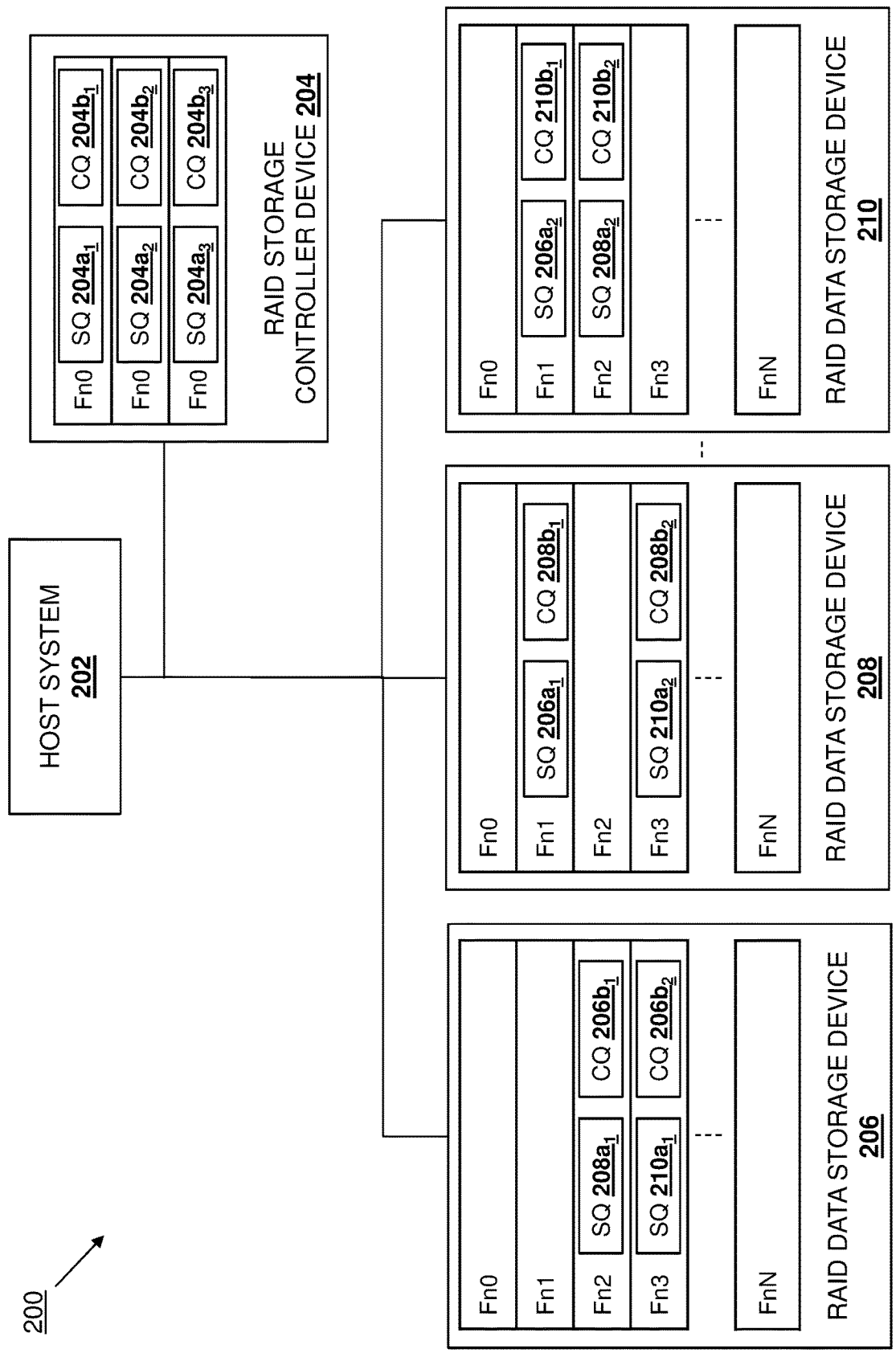
FIG. 6B is a schematic view illustrating an embodiment of the RAID data storage system of FIG. 2 operating during the method of FIG. 5.

For example, FIG. 6B illustrates how a submission queue 204a, and completion queue $204b_1$ may be provided for the RAID storage controller device 204/RAID data storage device 206 pair via an SR-IOV virtual function Fn0 in the RAID data storage device 206 using a memory subsystem in the RAID storage controller device 204, a submission queue $204a_2$ and completion queue $204b_2$ may be provided for the RAID storage controller device 204/RAID data storage device 208 pair via an SR-IOV virtual function Fn0 in the RAID data storage device 208 using a memory subsystem in the RAID storage controller device 204, and a submission queue $204a_3$ and completion queue $204b_3$ may be provided for the RAID storage controller device 204/RAID data storage device 210 pair via an SR-IOV virtual function Fn0 in the RAID data storage device 210 using a memory subsystem in the RAID storage controller device 204. However, one of skill in the art in possession of the present disclosure will appreciate that, while atypical, the memory subsystem for the submission and completion queues for the RAID storage controller device 204/RAID data storage device 206 pair may be stored in the memory/storage subsystem (e.g., the CMB subsystem) of the RAID data storage devices, and thus provided via the respective SR-IOV virtual functions Fn0 in those RAID data storage devices, while remaining within the scope of the present disclosure as well.

In an embodiment of block 502, the RAID storage controller engine 404 in the RAID storage controller device 204/400 may communicate with the RAID data storage engine 304 in the RAID data storage device 208/300 in order to create a submission queue 206a, for the RAID data storage device 208 (and for use by the SR-IOV virtual function Fn2 in the RAID data storage device 206) that is provided via the SR-IOV virtual function Fn1 by the RAID data storage controller included in the RAID data storage engine 304 in the RAID data storage device 208/300 using the buffer subsystem 308 (e.g., a CMB subsystem) in the RAID data storage device 208/300. For example, the submission queue 206a, may be created by the RAID storage controller engine 404 first setting up administrative submission and completion queues in the buffer subsystem 308 (e.g., a CMB subsystem) in the SR-IOV virtual function Fn1 in the RAID data storage device 208/300, and then issuing a "create I/O submission queue" command to the administrative submission queue to create the I/O submission queue 206a, in the buffer subsystem 308 (e.g., a CMB subsystem) in the SR-IOV virtual function Fn1 in the RAID data storage device 208/300.

The RAID storage controller engine 404 in the RAID storage controller device 204/400 may also communicate with the RAID data storage engine 304 in the RAID data storage device 208/300 in order to create a completion queue $206b_1$ for the RAID data storage device 208 (and for use by the SR-IOV virtual function Fn2 in the RAID data storage device 206) that is provided via the SR-IOV virtual function Fn2 by the RAID data storage controller included in the RAID data storage engine 304 in the RAID data storage device 206/300 using the buffer subsystem 308 (e.g., a CMB subsystem) in the RAID data storage device 206/300. For example, the completion queue $206b_1$ may be created by the RAID storage controller engine 404 first setting up administrative submission and completion queues in the buffer subsystem 308 (e.g., a CMB subsystem) in the SR-IOV virtual function Fn1 in the RAID data storage device 208/300, and then issuing a "create I/O completion queue" command to the administrative submission queue to create the I/O completion queue $206b_1$ in the buffer subsystem 308 (e.g., a CMB subsystem) in the SR-IOV virtual function Fn2 in the RAID data storage device 206/300.

Similarly, at block 502, the RAID storage controller engine 404 in the RAID storage controller device 204/400 may communicate with the RAID data storage engine 304 in the RAID data storage device 210/300 in order to create a submission queue $206a_2$ for the RAID data storage device 210 (and for use by the SR-IOV virtual function Fn3 in the RAID data storage device 206) that is provided via the SR-IOV virtual function Fn1 by the RAID data storage controller included in the RAID data storage engine 304 in the RAID data storage device 210/300 using the buffer subsystem 308 (e.g., a CMB subsystem) in the RAID data storage device 210/300. For example, the submission queue $206a_2$ may be created by the RAID storage controller engine 404 first setting up administrative submission and completion queues in the buffer subsystem 308 (e.g., a CMB subsystem) in the SR-IOV virtual function Fn1 in the RAID data storage device 210/300, and then issuing a "create I/O submission queue" command to the administrative submission queue to create the I/O submission queue $206a_2$ in the buffer subsystem 308 (e.g., a CMB subsystem) in the SR-IOV virtual function Fn1 in the RAID data storage device 210/300.

The RAID storage controller engine 404 in the RAID storage controller device 204/400 may also communicate with the RAID data storage engine 304 in the RAID data storage device 210/300 in order to create a completion queue $206b_2$ for the RAID data storage device 210 (and for use by the SR-IOV virtual function Fn3 in the RAID data storage device 206) that is provided via the SR-IOV virtual function Fn3 by the RAID data storage controller included in the RAID data storage engine 304 in the RAID data storage device 206/300 using the buffer subsystem 308 (e.g., a CMB subsystem) in the RAID data storage device 206/300. For example, the completion queue 206$b_2$ may be created by the RAID storage controller engine 404 first setting up administrative submission and completion queues in the buffer subsystem 308 (e.g., a CMB subsystem) in the SR-IOV virtual function Fn1 in the RAID data storage device 210/300, and then issuing a "create I/O completion queue" command to the administrative submission queue to create the I/O completion queue 206$b_2$ in the buffer subsystem 308 (e.g., a CMB subsystem) in the SR-IOV virtual function Fn2 in the RAID data storage device 206/300.

Similarly as well, at block 502, the RAID storage controller engine 404 in the RAID storage controller device 204/400 may communicate with the RAID data storage engine 304 in the RAID data storage device 206/300 in order to create a submission queue 208$a_1$ for the RAID data storage device 206 (and for use by the SR-IOV virtual function Fn1 in the RAID data storage device 208) that is provided via the SR-IOV virtual function Fn2 by the RAID data storage controller included in the RAID data storage engine 304 in the RAID data storage device 206/300 using the buffer subsystem 308 (e.g., a CMB subsystem) in the RAID data storage device 206/300. For example, the submission queue 208$a_1$ may be created by the RAID storage controller engine 404 first setting up administrative submission and completion queues in the buffer subsystem 308 (e.g., a CMB subsystem) in the SR-IOV virtual function Fn2 in the RAID data storage device 206/300, and then issuing a "create I/O submission queue" command to the administrative submission queue to create the I/O submission queue 208$a_1$ in the buffer subsystem 308 (e.g., a CMB subsystem) in the SR-IOV virtual function Fn2 in the RAID data storage device 206/300.

The RAID storage controller engine 404 in the RAID storage controller device 204/400 may also communicate with the RAID data storage engine 304 in the RAID data storage device 206/300 in order to create a completion queue 208$b_1$ for the RAID data storage device 206 (and for use by the SR-IOV virtual function Fn1 in the RAID data storage device 208) that is provided via the SR-IOV virtual function Fn1 by the RAID data storage controller included in the RAID data storage engine 304 in the RAID data storage device 208/300 using the buffer subsystem 308 (e.g., a CMB subsystem) in the RAID data storage device 208/300. For example, the completion queue 208$b_1$ may be created by the RAID storage controller engine 404 first setting up administrative submission and completion queues in the buffer subsystem 308 (e.g., a CMB subsystem) in the SR-IOV virtual function Fn2 in the RAID data storage device 206/300, and then issuing a "create I/O completion queue" command to the administrative submission queue to create the I/O completion queue 208$b_1$ in the buffer subsystem 308 (e.g., a CMB subsystem) in the SR-IOV virtual function Fn1 in the RAID data storage device 208/300.

Similarly as well, at block 502, the RAID storage controller engine 404 in the RAID storage controller device 204/400 may communicate with the RAID data storage engine 304 in the RAID data storage device 210/300 in order to create a submission queue 208$a_2$ for the RAID data storage device 210 (and for use by the SR-IOV virtual function Fn3 in the RAID data storage device 208) that is provided via the SR-IOV virtual function Fn2 by the RAID data storage controller included in the RAID data storage engine 304 in the RAID data storage device 210/300 using the buffer subsystem 308 (e.g., a CMB subsystem) in the RAID data storage device 210/300. For example, the submission queue 208$a_2$ may be created by the RAID storage controller engine 404 first setting up administrative submission and completion queues in the buffer subsystem 308 (e.g., a CMB subsystem) in the SR-IOV virtual function Fn2 in the RAID data storage device 210/300, and then issuing a "create I/O submission queue" command to the administrative submission queue to create the I/O submission queue 208$a_2$ in the buffer subsystem 308 (e.g., a CMB subsystem) in the SR-IOV virtual function Fn2 in the RAID data storage device 210/300.

The RAID storage controller engine 404 in the RAID storage controller device 204/400 may also communicate with the RAID data storage engine 304 in the RAID data storage device 210/300 in order to create a completion queue 208$b_2$ for the RAID data storage device 210 (and for use by the SR-IOV virtual function Fn3 in the RAID data storage device 208) that is provided via the SR-IOV virtual function Fn3 by the RAID data storage controller included in the RAID data storage engine 304 in the RAID data storage device 208/300 using the buffer subsystem 308 (e.g., a CMB subsystem) in the RAID data storage device 208/300. For example, the completion queue 208$b_2$ may be created by the RAID storage controller engine 404 first setting up administrative submission and completion queues in the buffer subsystem 308 (e.g., a CMB subsystem) in the SR-IOV virtual function Fn2 in the RAID data storage device 210/300, and then issuing a "create I/O completion queue" command to the administrative submission queue to create the I/O completion queue 208$b_2$ in the buffer subsystem 308 (e.g., a CMB subsystem) in the SR-IOV virtual function Fn3 in the RAID data storage device 208/300.

Similarly as well, at block 502, the RAID storage controller engine 404 in the RAID storage controller device 204/400 may communicate with the RAID data storage engine 304 in the RAID data storage device 206/300 in order to create a submission queue 210$a_1$ for the RAID data storage device 206 (and for use by the SR-IOV virtual function Fn1 in the RAID data storage device 210) that is provided via the SR-IOV virtual function Fn3 by the RAID data storage controller included in the RAID data storage engine 304 in the RAID data storage device 206/300 using the buffer subsystem 308 (e.g., a CMB subsystem) in the RAID data storage device 206/300. For example, the submission queue 210$a_1$ may be created by the RAID storage controller engine 404 first setting up administrative submission and completion queues in the buffer subsystem 308 (e.g., a CMB subsystem) in the SR-IOV virtual function Fn3 in the RAID data storage device 206/300, and then issuing a "create I/O submission queue" command to the administrative submission queue to create the I/O submission queue 210$a_1$ in the buffer subsystem 308 (e.g., a CMB subsystem) in the SR-IOV virtual function Fn3 in the RAID data storage device 206/300.

The RAID storage controller engine 404 in the RAID storage controller device 204/400 may also communicate with the RAID data storage engine 304 in the RAID data storage device 206/300 in order to create a completion queue 210$b_1$ for the RAID data storage device 206 (and for use by the SR-IOV virtual function Fn1 in the RAID data storage device 210) that is provided via the SR-IOV virtual function Fn1 by the RAID data storage controller included in the RAID data storage engine 304 in the RAID data storage device 210/300 using the buffer subsystem 308 (e.g., a CMB subsystem) in the RAID data storage device 210/300. For example, the completion queue 210$b_1$ may be created by the RAID storage controller engine 404 first setting up administrative submission and completion queues in the buffer subsystem 308 (e.g., a CMB subsystem) in the SR-IOV virtual function Fn3 in the RAID data storage device 206/300, and then issuing a "create I/O completion queue" command to the administrative submission queue to create the I/O completion queue $210b_1$ in the buffer subsystem 308 (e.g., a CMB subsystem) in the SR-IOV virtual function Fn1 in the RAID data storage device 210/300.

Similarly as well, at block 502, the RAID storage controller engine 404 in the RAID storage controller device 204/400 may communicate with the RAID data storage engine 304 in the RAID data storage device 208/300 in order to create a submission queue $210a_2$ for the RAID data storage device 208 (and for use by the SR-IOV virtual function Fn2 in the RAID data storage device 210) that is provided via the SR-IOV virtual function Fn3 by the RAID data storage controller included in the RAID data storage engine 304 in the RAID data storage device 208/300 using the buffer subsystem 308 (e.g., a CMB subsystem) in the RAID data storage device 208/300. For example, the submission queue $210a_2$ may be created by the RAID storage controller engine 404 first setting up administrative submission and completion queues in the buffer subsystem 308 (e.g., a CMB subsystem) in the SR-IOV virtual function Fn3 in the RAID data storage device 208/300, and then issuing a "create I/O submission queue" command to the administrative submission queue to create the I/O submission queue $210a_2$ in the buffer subsystem 308 (e.g., a CMB subsystem) in the SR-IOV virtual function Fn3 in the RAID data storage device 208/300.

The RAID storage controller engine 404 in the RAID storage controller device 204/400 may also communicate with the RAID data storage engine 304 in the RAID data storage device 208/300 in order to create a completion queue $210b_2$ for the RAID data storage device 208 (and for use by the SR-IOV virtual function Fn2 in the RAID data storage device 210) that is provided via the SR-IOV virtual function Fn2 by the RAID data storage controller included in the RAID data storage engine 304 in the RAID data storage device 208/300 using the buffer subsystem 308 (e.g., a CMB subsystem) in the RAID data storage device 208/300. For example, the completion queue $210b_2$ may be created by the RAID storage controller engine 404 first setting up administrative submission and completion queues in the buffer subsystem 308 (e.g., a CMB subsystem) in the SR-IOV virtual function Fn3 in the RAID data storage device 208/300, and then issuing a "create I/O completion queue" command to the administrative submission queue to create the I/O completion queue $210b_2$ in the buffer subsystem 308 (e.g., a CMB subsystem) in the SR-IOV virtual function Fn2 in the RAID data storage device 210/300.

As will be appreciated by one of skill in the art in possession of the present disclosure, the example illustrated in FIG. 6B and described above provides the submission queue for the first RAID data storage device in each RAID data storage device pair in the memory subsystem of the second RAID data storage device in that RAID data storage pair, while providing the completion queue for the first RAID data storage device in that RAID data storage device pair in the memory subsystem of the first RAID data storage device in that RAID data storage pair. However, one of skill in the art in possession of the present disclosure will recognize that the submission queue and completion queue for the first RAID data storage device in each RAID data storage device pair may both be provided in the second RAID data storage device in that RAID data storage device pair while remaining within the scope of the present disclosure as well. Furthermore, while a few specific examples of submission and completion queues have been described, one of skill in the art in possession of the present disclosure will appreciate that submission and completion queues of the present disclosure may be provided in a variety of manners that will fall within the scope of the present disclosure as well.

In addition to creating the submission and completion queues at block 502, the RAID storage controller device 204 may also configure each of the RAID data storage devices 206-210 to send interrupts directly to their peer RAID data storage devices. For example, each RAID data storage device 206-210 may include a Message Signaled Interrupt Extended (MSI-X) vector table that the RAID storage controller engine 404 in the RAID storage controller device 204/400 may configure to enable the RAID data storage engine 304 in that RAID data storage device to transmit an interrupt directly to the corresponding SR-IOV virtual function assigned to that RAID data storage device by, for example, identifying a memory address in a memory subsystem utilized by that SR-IOV virtual function. As such, at block 502, the RAID storage controller engine 404 in the RAID storage controller device 204/400 may configure the MSI-X vector table in the RAID data storage device 206 to enable the RAID data storage engine 304 in the RAID data storage device 206/300 to transmit interrupts directly to the SR-IOV virtual function Fn1 in the RAID data storage device 208 and the SR-IOV virtual function Fn1 in the RAID data storage device 210. Similarly, at block 502, the RAID storage controller engine 404 in the RAID storage controller device 204/400 may configure the MSI-X vector table in the RAID data storage device 208 to enable the RAID data storage engine 304 in the RAID data storage device 208/300 to transmit interrupts directly to the SR-IOV virtual function Fn2 in the RAID data storage device 206 and the SR-IOV virtual function Fn2 in the RAID data storage device 210.

Similarly as well, at block 502, the RAID storage controller engine 404 in the RAID storage controller device 204/400 may configure the MSI-X vector table in the RAID data storage device 210 to enable the RAID data storage engine 304 in the RAID data storage device 210/300 to transmit interrupts directly to the SR-IOV virtual function Fn3 in the RAID data storage device 206 and the SR-IOV virtual function Fn3 in the RAID data storage device 208. However, while a specific technique for providing direct interrupts between RAID data storage devices has been described, one of skill in the art in possession of the present disclosure will appreciate that other techniques that enable the direct interrupts of the present disclosure will fall within the scope of the present disclosure as well.

As will be appreciated by one of skill in the art in possession of the present disclosure, the creation of the submission queues and completion queues discussed above includes specifying the memory addresses where those submission queues and completion queues are located, and thus following block 502, a RAID data storage engine 304 in each RAID data storage device is configured to access submission queues and completion queues associated with those other RAID data storage devices. Furthermore, in the example above, the RAID storage controller device 204 is described as configuring the submission and completion queues using SR-IOV virtual functions in each RAID data storage device, and identifying the memory addresses in the memory subsystems to each RAID data storage device that will enable that RAID data storage device to issues commands directly to its peer RAID data storage devices via those submission and completion queues. However, one of skill in the art in possession of the present disclosure will appreciate how, in other embodiments, the RAID storage controller device 204 may identify memory addresses in the memory subsystems to each RAID data storage device that will be used for the submission and completion queues with their peer RAID data storage devices, and then have those RAID data storage devices configure the corresponding submission and completion queues while remaining within the scope of the present disclosure as well. As such, while a few specific examples of the configuration of the RAID data storage device direct communication queues of the present disclosure have been described, one of skill in the art in possession of the present disclosure will appreciate that the RAID data storage device direct communication queues of the present disclosure may be configured in a variety of manner that will fall within the scope of the present disclosure as well.

Figure 7A:
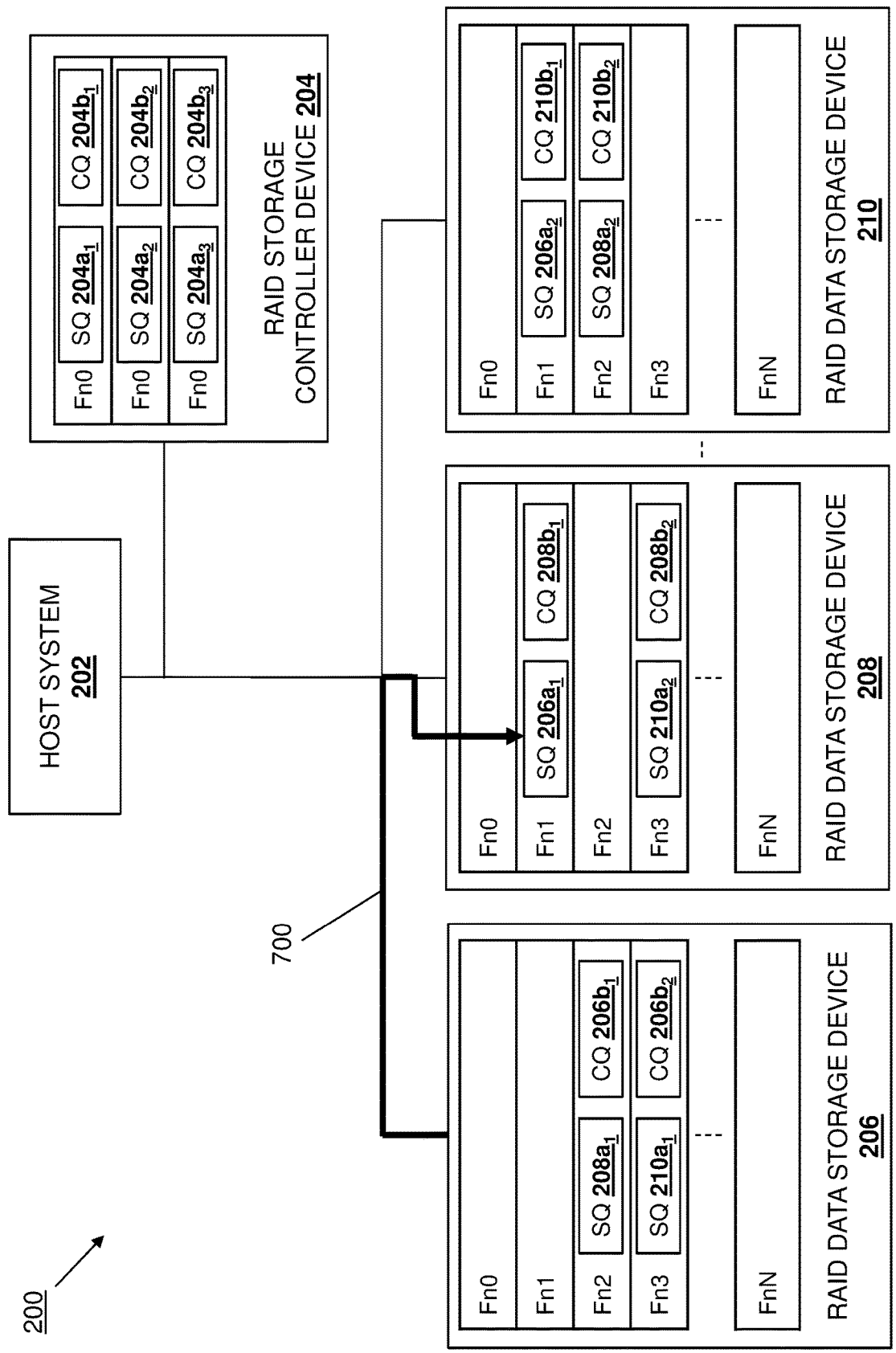
FIG. 7A is a schematic view illustrating an embodiment of the RAID data storage system of FIG. 2 operating during the method of FIG. 5.

The method 500 then proceeds to block 504 where a first RAID data storage device generates a command and transmits the command directly to a second RAID data storage device via its submission queue with the second RAID data storage device. In an embodiment, at block 504, the RAID data storage engine 304 in the RAID data storage device 206/300 (e.g., the SR-IOV virtual function Fn2 in the RAID data storage device 206) may generate a command for the SR-IOV virtual function Fn1 in the RAID data storage device 208. In some examples, the command generated at block 504 may be conventional RAID data storage device command. However, in other examples, the command generated at block 504 may be a multi-operation command or multi-step command described by the inventors of the present disclosure in U.S. patent application Ser. No. 16/832,348, filed on Mar. 27, 2020, the disclosure of which is incorporated herein by reference. As illustrated in FIG. 7A, at block 504, the RAID data storage engine 304 in the SR-IOV virtual function Fn1 in the RAID data storage device 206/300 may then transmit a command 700 to the RAID data storage device 208 via the submission queue 206a, provided by the SR-IOV virtual function Fn1 in the RAID data storage controller included in the RAID data storage engine 304 in the RAID data storage device 208/300 using the buffer subsystem 308 (e.g., a CMB subsystem) in the RAID data storage device 208/300. As will be appreciated by one of skill in the art in possession of the present disclosure, the transmission of the command 700 to the RAID data storage device 208 may include the RAID data storage engine 304 in the RAID data storage device 206/300 writing the command 700 directly to the submission queue 206a, included in the buffer subsystem 308 (e.g., a CMB subsystem) in the RAID data storage device 208/300, and then ringing the submission queue doorbell for the SR-IOV virtual function Fn1 in the RAID data storage device 208/300 to inform it that the command 700 is waiting in the submission queue 206$a_1$.

Figure 7B:
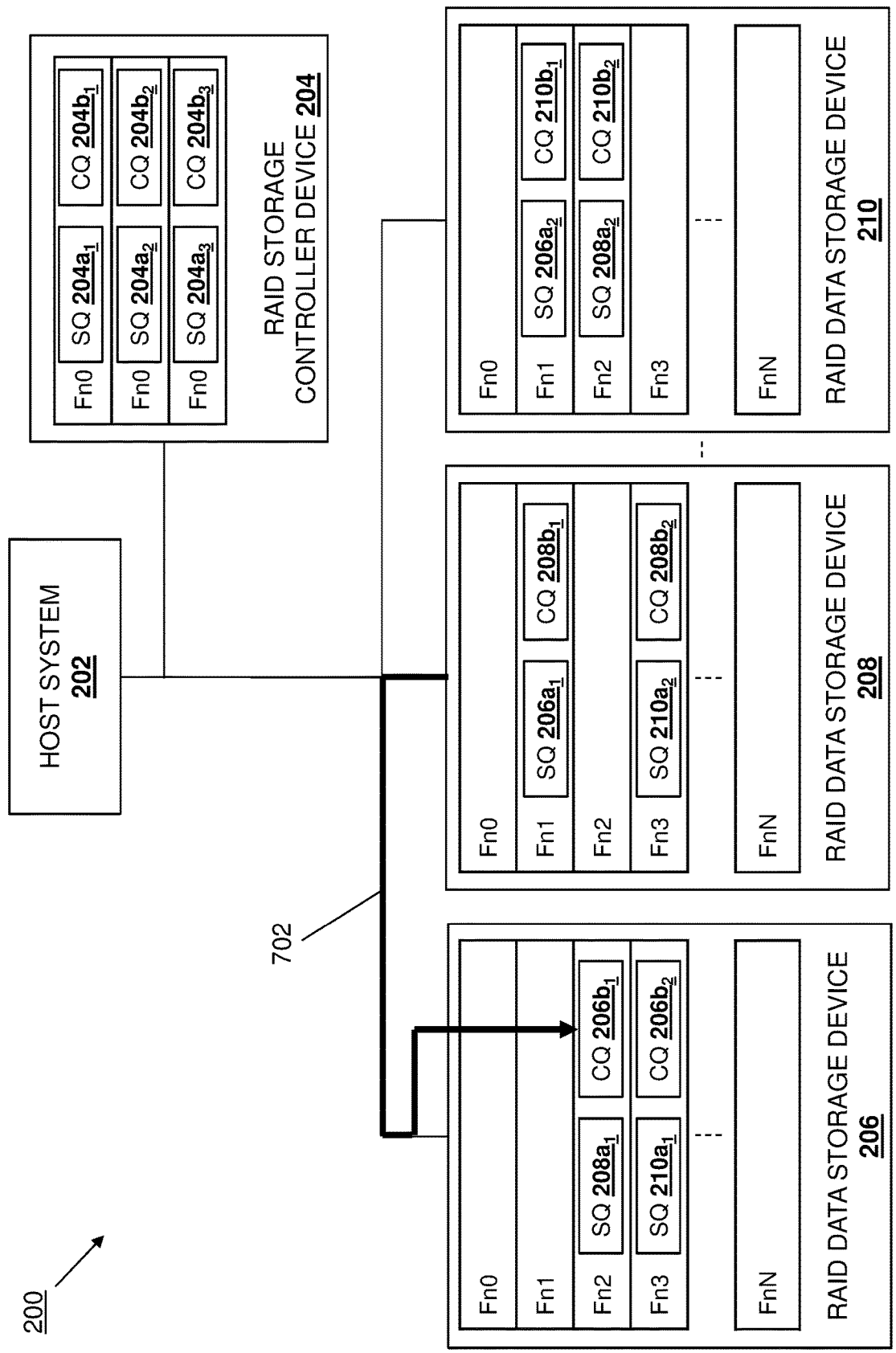
FIG. 7B is a schematic view illustrating an embodiment of the RAID data storage system of FIG. 2 operating during the method of FIG. 5.

The method 500 then proceeds to block 506 where the second RAID data storage device executes the command, generates a completion message, and transmits the completion message directly to the first RAID data storage device via its completion queue with the first RAID data storage device. In an embodiment, at block 506 and subsequent to the RAID data storage device 206 writing the command 700 to the submission queue 206a, and ringing the submission queue doorbell for the SR-IOV virtual function Fn1 in the RAID data storage device 208/300, the RAID data storage engine 304 in the RAID data storage device 208/300 may identify the command 700 in the submission queue 206$a_1$, and execute that command 700 to perform any operations instructed by that command 700. In response to completing the operations instructed by the command 700, the RAID data storage engine 304 in the RAID data storage device 208/300 may then generate a completion message, and transmit that completion message directly to the RAID data storage device 206. As illustrated in FIG. 7B, at block 506, the RAID data storage engine 304 in the RAID data storage device 208/300 may transmit a completion message 702 to the RAID data storage device 206 via the completion queue 206$b_1$ provided by the SR-IOV virtual function Fn2 in the RAID data storage controller included in the RAID data storage engine 304 in the RAID data storage device 206/300 using the buffer subsystem 308 (e.g., a CMB subsystem) in the RAID data storage device 206/300. As will be appreciated by one of skill in the art in possession of the present disclosure, the transmission of the completion message 702 to the RAID data storage device 206 may include the RAID data storage engine 304 in the RAID data storage device 208/300 writing the completion message 702 directly to the completion queue 206$b_1$ included in the buffer subsystem 308 (e.g., a CMB subsystem) in the RAID data storage device 206/300.

Figure 7C:
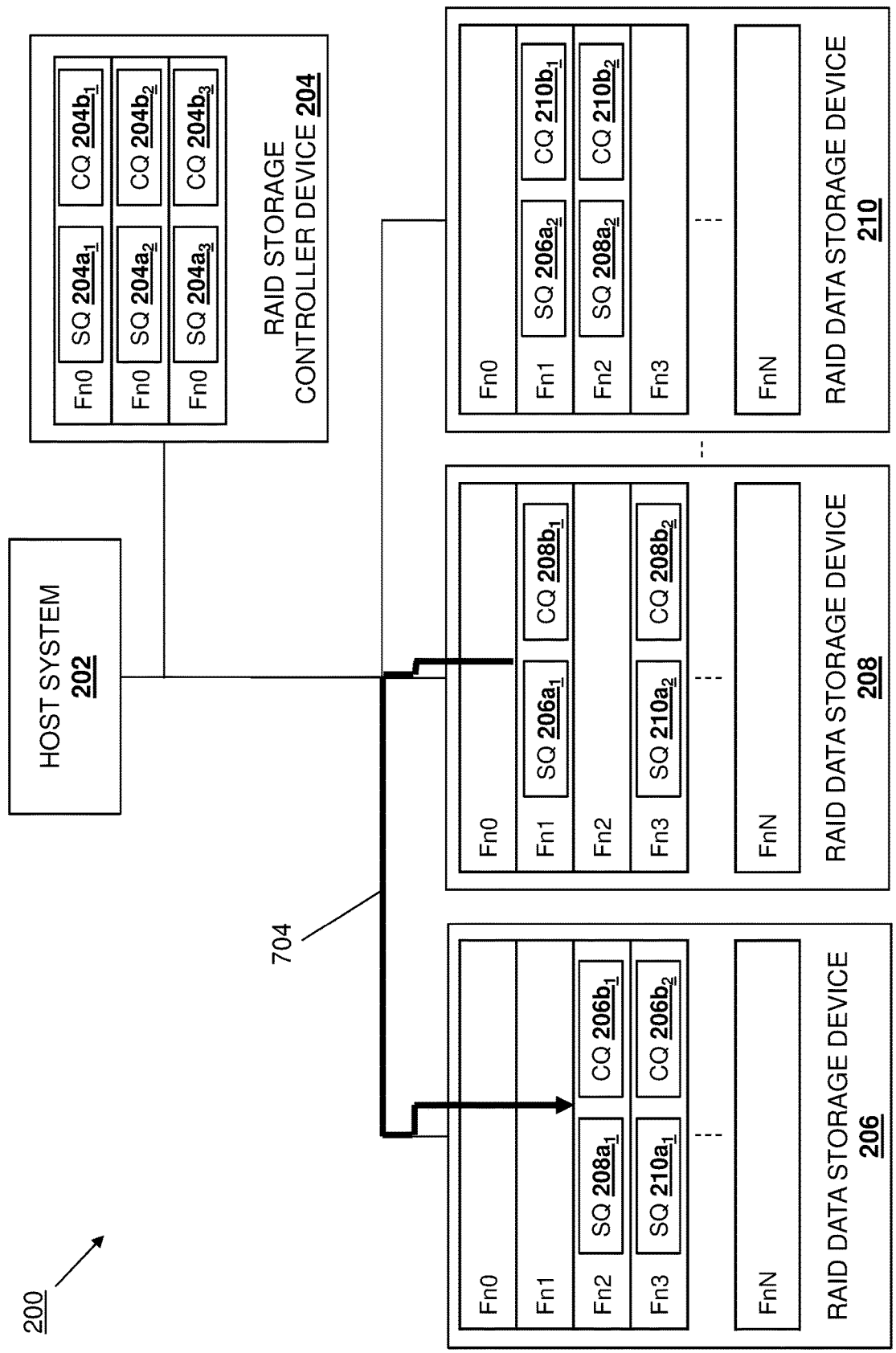
FIG. 7C is a schematic view illustrating an embodiment of the RAID data storage system of FIG. 2 operating during the method of FIG. 5.

The method 500 then proceeds to block 508 where the second RAID data storage device generates an interrupt and transmits the interrupt directly to the first RAID data storage device. With reference to FIG. 7C, in an embodiment of block 508 and subsequent to transmitting the completion message 704 to the RAID data storage device 206, the RAID data storage engine 304 in the RAID data storage device 208/300 may transmit an interrupt 704 directly to the RAID data storage device 206. As discussed above, the MSI-X vector table in the RAID data storage device 208 may be configured to enable the RAID data storage engine 304 in the RAID data storage device 208/300 to transmit interrupts directly to the SR-IOV virtual function Fn2 in the RAID data storage device 206 and, as such, at block 508, the RAID data storage engine 304 in the RAID data storage device 208/300 may transmit the interrupt 704 by, for example, writing to a memory address that is identified in its MSI-X vector table and that is included in a memory subsystem utilized by the SR-IOV virtual function Fn2 in the RAID data storage device 206.

The method 500 then proceeds to block 510 where the first RAID data storage device receives the interrupt and accesses the completion message in its completion queue for the second RAID data storage device. In an embodiment, at block 510, the RAID data storage engine 304 in the RAID data storage device 206/300 may receive the interrupt 704 transmitted by the RAID data storage device 208 and, in response, may access the completion queue 206$b_1$ provided by the SR-IOV virtual function Fn2 in order to retrieve the completion message 702 transmitted by the RAID data storage device 208. In some examples, the RAID data storage engine 304 in the RAID data storage device 206/300 may receive the interrupt 704 by monitoring the memory address in its memory subsystem (e.g., a CMB subsystem) that was identified in the MSI-X vector table of the RAID data storage device 208 for providing interrupts to the RAID data storage device 206, and detecting the writing of data to that memory address. However, in other examples, the RAID data storage engine 304 in the RAID data storage device 206/300 may receive the interrupt 704 by implementing an Input/Output Advanced Programmable Interrupt Controller (IOAPIC) mapped to a Base Address Register (BAR) space provided for each SR-IOV virtual function, and/or utilizing other interrupt detection mechanisms that would be apparent to one of skill in the art in possession of the present disclosure. As will be appreciated by one of skill in the art in possession of the present disclosure, in response to retrieving the completion message 702, the RAID data storage engine 304 in the RAID data storage device 206/300 may determine that the command 700 has been completed.

As will be recognized by one of skill in the art in possession of the present disclosure, the example above describes a "push/push" command exchange where the command 700 is "pushed" by the RAID data storage device 206 writing the command 700 to the submission queue 206a, in the RAID data storage device 208, and the completion message 702 is "pushed" by the RAID data storage device 208 writing the completion message 702 to the completion queue $206b_1$ in the RAID data storage device 206. However, in submission/completion queue configurations in which, for example, the submission and completion queue for the RAID data storage device 206 are both included on the RAID data storage device 208, a "push/pull" command exchange may be employed with the command being "pushed" by the RAID data storage device 206 writing the command to the submission queue in the RAID data storage device 208, and the completion message being "pulled" by the RAID data storage device 208 writing the completion message to the completion queue in the RAID data storage device 208 and sending the interrupt to the RAID data storage device 206 that causes the RAID data storage device 206 to retrieve that completion message from the completion queue in the RAID data storage device 208. One of skill in the art in possession of the present disclosure will appreciate how "pull/push" command exchanges and "pull/pull" command exchanges may be enabled in a similar manner based on different submission and completion queue configurations while remaining within the scope of the present disclosure as well.

Thus, systems and methods have been described that provides RAID data storage devices in a RAID data storage system the ability to exchange command communications directly with each other. For example, a RAID storage controller device may operate to configure first RAID data storage device that includes a first RAID data storage device controller having a first RAID data storage device function with a second RAID data storage device submission queue in a first RAID data storage device memory subsystem, and may configure a second RAID data storage device that includes a second RAID data storage device controller having a second RAID data storage device function with a second RAID data storage device completion queue in a second RAID data storage device memory subsystem. The second RAID data storage device may then generate a command, transmit the command directly to first RAID data storage device and in the second RAID data storage device submission queue in the first RAID data storage device memory subsystem, and receive a completion message that is associated with the command directly from the first RAID data storage device and in the second RAID data storage device completion queue in the second RAID data storage device memory subsystem. As such, the RAID storage controller device is relieved of command communication overhead via the operation of the RAID data storage devices that are configured to directly exchange commands to initiate their performance of RAID storage-device-assisted data updates and/or other RAID data storage device operations known in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disks (RAID) data storage device direct communication system, comprising:
a first Redundant Array of Independent Disks (RAID) data storage device that includes a first RAID data storage device controller having a first RAID data storage device function providing a second RAID data storage device submission queue in a first RAID data storage device memory subsystem; and
a second RAID data storage device that includes a second RAID data storage device controller having a second RAID data storage device function providing a second RAID data storage device completion queue in a second RAID data storage device memory subsystem, wherein the first RAID data storage device and the second RAID data storage device are coupled to a RAID storage controller device that is configured to provide commands to the first RAID data storage device and the second RAID data storage device, and wherein the second RAID data storage device is configured to:
generate a command independent of the RAID storage controller device;
transmit the command directly to the first RAID data storage device and in the second RAID data storage device submission queue in the first RAID data storage device memory subsystem; and
receive a completion message that is associated with the command directly from the first RAID data storage device and in the second RAID data storage device completion queue in the second RAID data storage device memory subsystem.

2. The system of claim 1, wherein the second RAID data storage device is configured to:
receive an interrupt directly from the first RAID data storage device at the second RAID data storage device function.

3. The system of claim 1, wherein the first RAID data storage device memory subsystem is a first RAID data storage device Controller Memory Buffer (CMB) subsystem, and wherein the second RAID data storage device memory subsystem is a second RAID data storage device CMB subsystem.

4. The system of claim 1, wherein the first RAID data storage device function is a first RAID data storage device Single Root Input/Output Virtualization (SR-IOV) function, and wherein the second RAID data storage device function is a second RAID data storage device SR-IOV function.

5. The system of claim 1, wherein the first RAID data storage device is configured to:
communicate with a RAID storage controller device to create the second RAID data storage device submission queue via the first RAID data storage device function, and wherein the second RAID data storage device is configured to:
communicate with the RAID storage controller device to create the second RAID data storage device completion queue via the second RAID data storage device function.

6. The system of claim 1, wherein the first RAID data storage device is configured to:
communicate with the RAID storage controller device to identify at least one address in the second RAID data storage device memory subsystem that provides the second RAID data storage device completion queue, and wherein the second RAID data storage device is configured to:
 communicate with a RAID storage controller device to identify at least one address in the first RAID data storage device memory subsystem that provides the second RAID data storage device submission queue.

7. An Information Handling System (IHS), comprising:
a processing system; and
a memory system that is coupled to the processing system and that includes instructions that, when executed by the processing system, cause the processing system to provide a second Redundant Array of Independent Disks (RAID) data storage device engine that is configured to:
 generate a command independent of a RAID storage controller device that is coupled to the processing system;
 transmit the command directly to a first RAID data storage device and in a second RAID data storage device submission queue that is included in a first RAID data storage device memory subsystem and provided by a first RAID data storage device function provided in a first RAID data storage device controller in the first RAID data storage device, wherein the first RAID data storage device is coupled to the RAID storage controller device that is configured to provide commands to the first RAID data storage device; and
 receive a completion message that is associated with the command directly from the first RAID data storage device and in a second RAID data storage device completion queue that is included in a second RAID data storage device memory subsystem and provided by a second RAID data storage device function provided in a second RAID data storage device controller in the second RAID data storage device.

8. The IHS of claim 7, wherein the second RAID data storage device engine is configured to:
 receive an interrupt directly from the first RAID data storage device at the second RAID data storage device function.

9. The IHS of claim 8, wherein the receiving the interrupt at the second RAID data storage device function includes determining that an address identified in a Message Signaled Interrupt extended (MSI-X) vector table has been written to.

10. The IHS of claim 7, wherein the first RAID data storage device memory subsystem is a first RAID data storage device Controller Memory Buffer (CMB) subsystem, and wherein the second RAID data storage device memory subsystem is a second RAID data storage device CMB subsystem.

11. The IHS of claim 7, wherein the first RAID data storage device function is a first RAID data storage device Single Root Input/Output Virtualization (SR-IOV) function, and wherein the second RAID data storage device function is a second RAID data storage device SR-IOV function.

12. The IHS of claim 7, wherein the second RAID data storage device engine is configured to:
 communicate with a RAID storage controller device to create the second RAID data storage device completion queue via the second RAID data storage device function.

13. The IHS of claim 7, wherein the second RAID data storage device engine is configured to:
 communicate with a RAID storage controller device to identify at least one address in the first RAID data storage device memory subsystem that provides the second RAID data storage device submission queue.

14. A method for providing direct communication between Redundant Array of Independent Disks (RAID) data storage devices, comprising:
 generating, by a first Redundant Array of Independent Disks (RAID) data storage device and independent of a RAID storage controller device that is coupled to the first RAID data storage device, a command;
 transmitting, by the first RAID data storage device, the command directly to a second RAID data storage device and in a first RAID data storage device submission queue that is included in a second RAID data storage device memory subsystem and provided by a second RAID data storage device function provided in a second RAID data storage device controller in the second RAID data storage device, wherein the second RAID data storage device is coupled to the RAID storage controller device that is configured to provide commands to the first RAID data storage device and the second RAID data storage device; and
 receiving, by the first RAID data storage device, a completion message that is associated with the command directly from the second RAID data storage device and in a first RAID data storage device completion queue that is included in a first RAID data storage device memory subsystem and provided by a first RAID data storage device function provided in a first RAID data storage device controller in the first RAID data storage device.

15. The method of claim 14, further comprising:
 receiving, by the first RAID data storage device, an interrupt directly from the second RAID data storage device at the first RAID data storage device function.

16. The method of claim 15, wherein the receiving the interrupt at the first RAID data storage device function includes determining that an address identified in a Message Signaled Interrupt extended (MSI-X) vector table has been written to.

17. The method of claim 14, wherein the first RAID data storage device memory subsystem is a first RAID data storage device Controller Memory Buffer (CMB) subsystem, and wherein the second RAID data storage device memory subsystem is a second RAID data storage device CMB subsystem.

18. The method of claim 14, wherein the first RAID data storage device function is a first RAID data storage device Single Root Input/Output Virtualization (SR-IOV) function, and wherein the second RAID data storage device function is a second RAID data storage device SR-IOV function.

19. The method of claim 14, further comprising:
 communicating, by the first RAID data storage device, with a RAID storage controller device to create the first RAID data storage device completion queue via the first RAID data storage device function.

20. The method of claim 14, further comprising:
 communicating, by the first RAID data storage device, with a RAID storage controller device to identify at least one address in the second RAID data storage device memory subsystem that provides the first RAID data storage device submission queue.

* * * * *